(No Model.)

W. L. C. ACKERMANN.
VESSEL.

No. 247,526. Patented Sept. 27, 1881.

Witnesses:
R. L. Gerbe.
O. J. Bailey.

Inventor:
W. L. C. Ackermann.
by J. L. Gerbe
Atty.

UNITED STATES PATENT OFFICE.

WILLIAM L. C. ACKERMANN, OF RED WING, MINNESOTA.

VESSEL.

SPECIFICATION forming part of Letters Patent No. 247,526, dated September 27, 1881.

Application filed January 17, 1881. (No model.)

*To all whom it may concern:*

Be it known that I, WILLIAM LEOPOLD CARL ACKERMANN, of Red Wing, in the county of Goodhue and State of Minnesota, have invented a new and useful Improvement in Vessels, which improvement is fully set forth in the following specification and accompanying drawings, in which—

Figure 1:
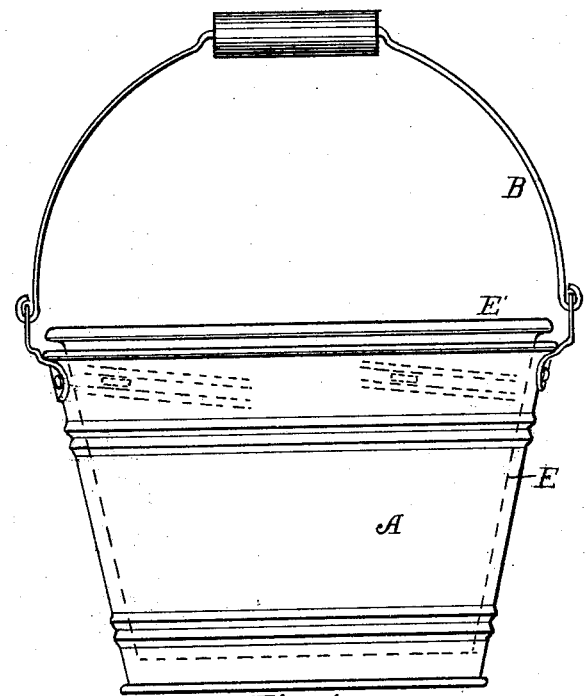
Figure 2:
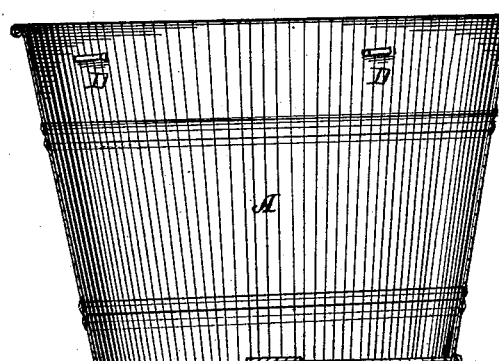
Figure 3:
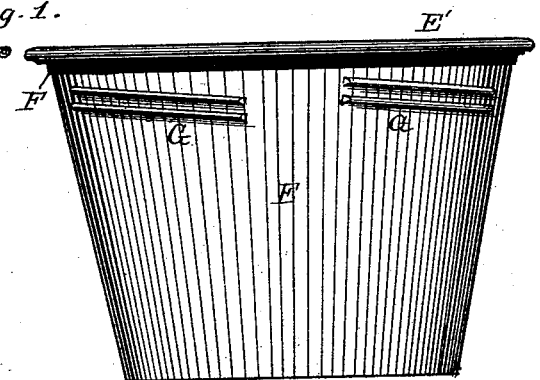
Figure 4:
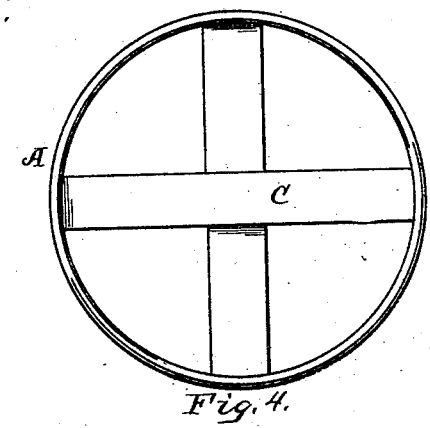

Figure 1 is a side view of the vessel provided with the metallic casing. Fig. 2 is a vertical sectional view of the metallic casing. Fig. 3 is a front view of the vessel, and Fig. 4 is the bottom of the external metallic casing.

The object of my invention is to construct a stone, white, or earthen ware vessel in a peculiar manner, and provide it with a metallic covering or casing, as will be hereinafter more fully set forth.

Referring to the accompanying drawings, A represents a metallic casing in the form of a bucket provided with a bail, B. This casing has no bottom, but instead two metallic cross-pieces, C, secured at their opposite ends to the base of the casing. Within and near the top are three or four lugs, D, equidistant from each other.

E represents the inner vessel, which is composed of either stone, earthen, or white ware. When made of common ware it is designed to be made thinner than common jars or vessels of this class. If constructed of white ware, it is intended to be of the thickness common to ordinary pitchers, but glazed only on the inside. The object of this is to permit the air between the metallic casing and this vessel to penetrate the vessel, thus acting as a refrigerator, keeping the contents fresh and cool. On the outer surface, near the top, are three or four sets of ribs, G, equidistant from each other. Each set is composed of two ribs a slight distance apart, running parallel with each other, and these extend around the vessel at an incline. The lugs D of the metallic casing are designed to engage with these ribs when the vessel E is placed in the casing, and by giving a quarter-turn the two vessels are secured to each other.

The upper edge of the vessel E is provided with a flange, E', and a rubber band, F, is placed around the vessel E, under the flange, so that when the vessel is placed in the casing A the flange E' will rest on the rim of the casing and compress the rubber band, thus making a tight joint at this point, and prevent the direct contact of the outer and inner vessels. Hemp, felting, or other packing material will answer the purpose as readily, the principal object being to prevent the vessels from touching each other, as well as to protect the inner vessel as much as possible from breakage, and, further, to prevent water from passing through while being used.

The advantages of a vessel constructed in this manner are many. It is suitable for any substance, without injury to vessel or contents; water is kept cooler and fresher, without becoming impregnated with odors or tastes from the vessel containing it; it is indestructible if used with any degree of care, and in case the inner vessel should break it can readily be replaced at a small cost.

I am aware that Letters Patent No. 235,960 show an earthenware vessel which consists of two chambers with an unglazed partition between them; but I disclaim this as any part of my invention.

Having described my invention, what I claim as new, and desire to secure by Letters Patent, is—

1. An inner vessel composed of earthen, stone, or white ware having an annular flange at the rim, beneath which is placed packing material, and further provided on its sides with downwardly-inclined ribs, by means of which it may be attached to an outer vessel, in combination with the outer vessel, as and for the purpose specified.

2. A vessel of stone, earthen, or white ware, glazed on the inside and unglazed without, in combination with an outer metallic casing or covering, as herein set forth.

3. A stone, earthen, or white ware vessel having a flange at the rim and provided with downwardly-inclined ribs on the sides, in combination with an outer metallic covering or casing having a bail and an open bottom, and provided with lugs on the inner surface, near the rim, to engage with the ribs of the inner vessel, and the packing between the flange of the inner vessel and the rim of the casing, as and for the purpose specified.

In testimony that I claim the foregoing I have hereunto set my hand this 12th day of January, A. D. 1881.

WILLIAM LEOPOLD CARL ACKERMANN.

Witnesses:
O. M. HALL,
D. HALLAN,
L. Y. LENHART.